United States Patent
Coyle et al.

(10) Patent No.: US 8,958,452 B2
(45) Date of Patent: Feb. 17, 2015

(54) SYSTEM, APPARATUS AND METHOD EMPLOYING A DUAL HEAD LASER

(71) Applicant: The United States of America as represented by the Administrator of the National Aeronautics and Space Administration, Washington, DC (US)

(72) Inventors: Donald B. Coyle, Ellicott City, MD (US); Paul R. Stysley, Catonsville, MD (US); Demetrios Poulios, Baltimore, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 94 days.

(21) Appl. No.: 13/622,465

(22) Filed: Sep. 19, 2012

(65) Prior Publication Data
US 2014/0079084 A1    Mar. 20, 2014

(51) Int. Cl.
| | |
|---|---|
| *H01S 3/091* | (2006.01) |
| *H01S 3/04* | (2006.01) |
| *H01S 3/07* | (2006.01) |
| *H01S 3/08* | (2006.01) |
| *H01S 3/115* | (2006.01) |
| H01S 3/0941 | (2006.01) |
| H01S 3/16 | (2006.01) |
| H01S 3/02 | (2006.01) |
| H01S 3/06 | (2006.01) |

(52) U.S. Cl.
CPC .... *H01S 3/04* (2013.01); *H01S 3/07* (2013.01); *H01S 3/08054* (2013.01); *H01S 3/08072* (2013.01); *H01S 3/115* (2013.01); *H01S 3/08004* (2013.01); *H01S 3/08095* (2013.01); *H01S 3/0941* (2013.01); *H01S 3/1611* (2013.01); *H01S 3/1685* (2013.01); *H01S 3/025* (2013.01); *H01S 3/0405* (2013.01); *H01S 3/0606* (2013.01); *H01S 3/1643* (2013.01)
USPC .................................................. 372/70

(58) Field of Classification Search
CPC ..... H01S 5/024; H01S 3/1026; H01S 3/0405; H01S 5/02438; H01S 5/0268; H01S 5/4025; H01S 5/42
USPC ................................. 372/69, 70, 39
See application file for complete search history.

(56) References Cited

U.S. PATENT DOCUMENTS

| | | | | |
|---|---|---|---|---|
| 4,802,180 | A * | 1/1989 | Brandle, Jr. et al. | 372/41 |
| 6,373,868 | B1 * | 4/2002 | Zhang | 372/19 |
| 2004/0037340 | A1 * | 2/2004 | Yanagisawa et al. | 372/70 |
| 2005/0135452 | A1 * | 6/2005 | Ishizu | 372/70 |
| 2011/0216792 | A1 * | 9/2011 | Chann et al. | 372/31 |

* cited by examiner

*Primary Examiner* — Tuan Nguyen

(57) ABSTRACT

A system, apparatus and method employing a laser with a split-head, V-assembly gain material configuration. Additionally, the present invention is directed to techniques to better dissipate or remove unwanted energies in laser operations. The present invention is also directed to techniques for better collimated laser beams, with single spatial mode quality (TEM00), with improved efficiency, in extreme environments, such as in outer space.

8 Claims, 4 Drawing Sheets

SYSTEM, APPARATUS AND METHOD EMPLOYING A DUAL HEAD LASER

ORIGIN OF THE INVENTION

The invention described herein was made by an employee of the United States Government, and may be manufactured and used by or for the Government for governmental purposes without the payment of any royalties thereon or therefore.

BACKGROUND OF THE INVENTION

1. Field of the Invention

The present invention is in the technical field of improving the capability of equipment for usage in Earth and planetary orbit and altimetry. The principles of the present invention are also applicable to any diode pumped, solid state laser system.

2. Description of Related Art

The exploration of our Earth and space requires equipment and techniques that push modern technologies. For example, the usage of lasers is increasingly common, but many of the operational aspects of lasers stand in the way of their deployment, particularly in the harsh environment of space and their inherent relative low efficiency (typically <10% electrical-to-optical). This invention improves the efficiency of these lasers, as well as enables higher pulse energies and/or higher average powers to be produced from a given design than the current state of the art.

A chief problem is the management and dissipation of the heat generated in the usage of laser equipment. A laser head or crystal in operation generates significant amounts of heat, which if not removed would deform the crystal sufficiently to render it inoperable, or at minimum, greatly distort the produced beam quality and reduce efficiency. Conventional cooling techniques, such as a contact circulating fluid, present problems of their own, e.g., the usage of liquids in the cold and vacuum of the upper atmosphere and in space. Similarly, heat sinks and other mechanisms only go so far in the removal of the operational heat. For example, in most space-based usage of lasers to date, the lasers typically have significantly reduced lifetime than that demonstrated on Earth, and some have failed in short order. The harshness of the environment and the delicacy of these instruments can mean almost immediate failure if not manufactured precisely. The cost of launching such equipment, apart from all of the R&D to get there, is very high, and prohibitive for small planetary missions, unless this problem is solved. Furthermore, with the ever-escalating power requirement for lasers, these heat dissipation problems become ever magnified, necessitating a paradigmic shift in thinking away from current techniques, which become ungainly, insufficient and inadequate for future space exploration. Finally, the heat removal capability with non-fluid, conductive means, have not been improved upon significantly in the past decade. This design offers a method of achieving gains in performance, mentioned above, by using the produced heat and thermo-optical effects to the laser cavity's advantage. In other words, the thermo-optical effects are employed to improve beam quality and efficiency, rather than attempting drastic means of removing the heat.

The National Aeronautics and Space Administration (NASA) has been at the forefront of technology for such developments. With the diverse needs of current and upcoming NASA space research, there is a growing need for laser equipment that has better operational stability for use in space, atmospheric and terrestrial instrumentation. Further, there is a need for devices, particularly—space-based devices that are more efficient, have greater operational lifespan, have reduced complexity and have lower in cost.

There is, therefore, a need for improved systems, equipment, compositions and methods that provide improved heat-dissipation capabilities for laser devices, that these devices be operational in harsh environments, that the lasers be operable in larger power ranges, and that the combination be able to function properly in difficult and extreme situations and environments.

SUMMARY OF THE INVENTION

The present invention is directed to a system, apparatus and method employing a laser with a split-head, V-assembly gain material configuration. Additionally, the present invention is directed to techniques to better dissipate or remove unwanted energies in laser operations. The present invention is also directed to techniques for better collimated, laser beams, with single spatial mode quality (TEM00), with improved efficiency, in extreme environments, such as in outer space.

BRIEF DESCRIPTION OF THE DRAWINGS

While the specification concludes with claims particularly pointing out and distinctly claiming the subject matter that is regarded as forming the present invention, it is believed that the invention will be better understood from the following Detailed Description, taken in conjunction with the accompanying DRAWINGS, where like reference numerals designate like structural and other elements, in which:

DETAILED DESCRIPTION OF THE INVENTION

The present invention will now be described more fully hereinafter with reference to the accompanying Drawings, in which preferred embodiments of the invention are shown. It is, of course, understood that this invention may, however, be embodied in many different forms and should not be construed as limited to the embodiments set forth herein; rather, these embodiments are provided so that the disclosure will be thorough and complete, and will fully convey the scope of the invention to those skilled in the art. It is, therefore, to be understood that other embodiments can be utilized and structural changes can be made without departing from the scope of the present invention.

As discussed, various efforts have been employed to address the problems of heat dissipation in the use of lasers. Lasers by their very nature are delicate and complex instruments. Although the mechanics of laser technology will not be fully addressed herein, it should be understood that the various components must perform at operational levels, e.g., so many mJ per pulse. Conventional laser construction has a gain medium, which receives and temporarily stores input energy, e.g., photons or other means, and reflectors or mirrors to concentrate the light or other energies so that they may escape at one end, i.e., the laser energy.

Figure 1:
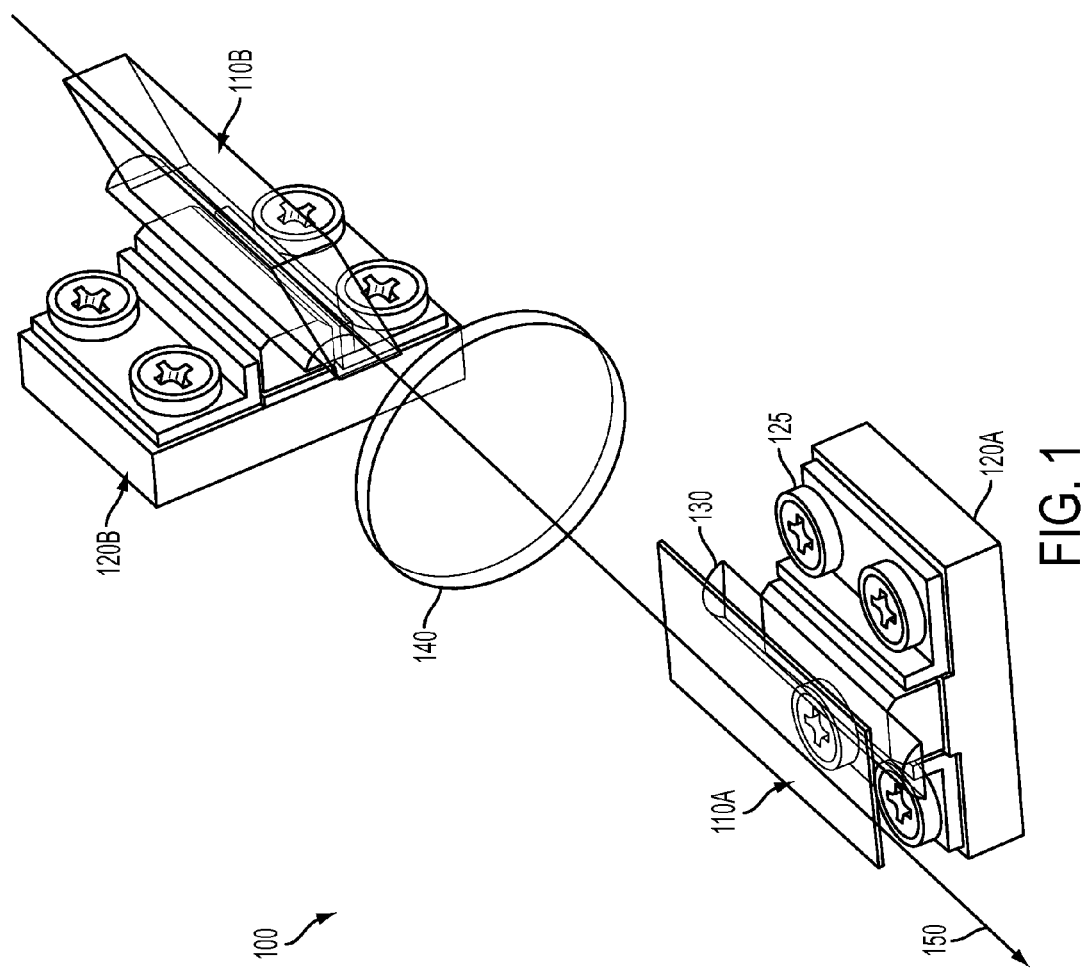
FIG. 1 is an isometric illustration of components employed in practicing the principles of the present invention.

With reference now to FIG. 1 of the DRAWINGS, there is shown an isometric view of apparatus in practicing the present invention, particularly a laser head configuration, generally designated by the reference numeral 100. As discussed, in conventional laser systems the configurations are susceptible to overheating and warping, rendering the equipment useless. As these systems are often employed in space or high altitude, these failures greatly also affect the missions, e.g., distance measurements involving LIDAR, altimetry, and orbital or other space equipment for detecting and measuring ice, vegetation, atmospheric conditions, aerosols, winds, and crust movement and a host of other uses.

With reference to FIG. 1, a gain medium is shown, which is used in amplifying the light. It should be understood that laser light is but one form of energy that may be created and amplified, and is herein employed as a representation form of that energy. In the prior art, the gain medium is one piece of material, and, as noted, the problem is that the temperatures and heat problems quickly destroy the equipment, without adequate measures to reduce the operational heat, which, in turn, greatly increases the complexity and cost of the equipment. In the instant invention, the gain medium is in at least two parts, designated by the reference numerals 110A and 110B. As shown, gains 110A and 110B are orthogonally aligned to each other.

Also shown in FIG. 1 are laser diode arrays, which as one of skill I the art knows produces the energy for the laser, e.g., by pumping the energy into the aforementioned gains 110A and 110B. These laser diode array configurations are generally designated by the reference numerals 120A and 120B, which pump energy, e.g., at 800 nm, into the respective gains. The energy so produced is preferably first passed through a pump lens, generally designated by the reference numeral 130, and then to the gains or slabs 110A and 110B. As is understood in the art, the material constituency of the gains determines their ability to store the large energies needed for laser operation, e.g., to have a high energy saturation point, which upon release reflect and build to laser strengths, as discussed further hereinbelow and as known to those of skill in the art. As discussed further hereinbelow, gains made of Neodymium-doped Ytterbium Aluminum Garnet or like material allow such energy storage through atomic transitions. At saturation, the energy is then released. The aforementioned pump lens 130 may be cylindrically-shaped and made of fused silica.

With reference again to FIG. 1, there is also shown a waveplate, particularly a one half waveplate, generally designated by the reference numeral 140, positioned between the two gains 110 and between the aforementioned reflections. As is known in the art, light, such as sunlight, is polarized, e.g., the photons are horizontally and vertically aligned. Sunglasses and the like are able to filter these orientations and allow only some through. The waveplate 140 of the present invention exploits some principles of physics, such as the Brewster angle, to flip the polarization of the light 90 degrees. For example, light traveling through the gain 110A toward gain 110B, and vice versa, has the energy passing through the waveplate, preferably a one half waveplate, reorient the energy to match the polarization of the other gain material. As noted, in the prior art, there is no such reorientation.

The isometric axis, which is also the direction of the resultant laser beam is generally designated by the reference numeral 150. It is preferred that the laser beam be a symmetrical round or pencil beam along axis 150, which is termed single spatial mode, or TEM00 for Transverse Electro-Magnetic 00 fundamental mode. In the prior art, this is difficult to achieve with laser slabs as the gain medium geometry since the configurations are less capable of producing a symmetric beam due to the aforementioned thermal problems. The use of slab geometries are desired for solid state laser systems since they offer the highest possible energy extraction due to the zig-zag optical path traced through the pumped region of the material. This elongated path allows the cavity-formed TEM00 laser beam profile to overlap with the highest possible fraction of the absorbed or energized gain volume. Effectively, the present invention allows laser slabs to behave optically like cylindrical laser rods, but with much higher efficiency and laser energy production capability, but without the fluid-based, heat removing complexities of rods.

Figure 2:
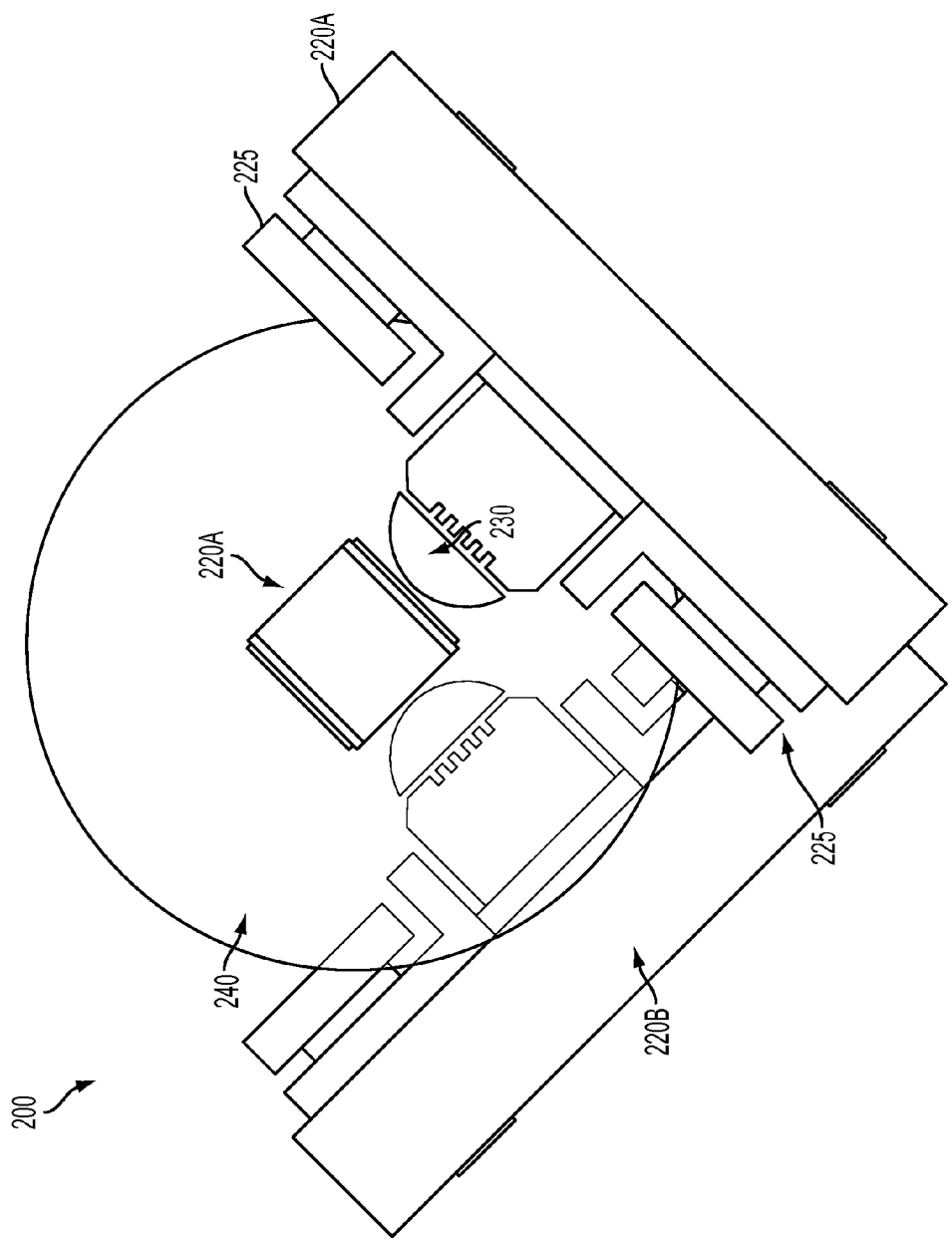
FIG. 2 is an end view of the components illustrated in FIG. 1 in an assembled state.

With reference now to FIG. 2 of the DRAWINGS, there is shown the dual head configuration of FIG. 1 assembled and oriented along the aforementioned axis 150 (now perpendicular to the sheet), and general designated by the reference numeral 200. As shown, a foreground diode array, generally designated by the reference numeral 220A, corresponds to the aforedescribed diode array 120A in FIG. 1, with like reference numerals in the instant application referring to like components. An electrically-isolated washer, such as a Delrin washer, generally designated by the reference numeral 125 and 225, is employed for mounting and isolating the diode arrays 120A and 120B in FIGS. 1 and 220A and 220B in FIG. 2.

Atop the diode arrays 220 are respective pump lenses 230. As shown in FIG. 2, the pump lenses 230 concentrate or collimate the diode arrays' energy into the aforementioned gain material 220A. The corresponding energy infusion into the gain material 210B also occurs. As noted, a waveplate 240 is there between, governing the polarity transitions of photons transceived therein and transmission to the opposite gain material 210. As discussed, the axis 150 is perpendicular the sheet of FIG. 2 and through the center of the gain material 220A shown.

As discussed, the present invention offers a radically different design over the prior art. Splitting the gain material 110/210 and aligning them orthogonally, overcomes many of the problems of the conventional techniques in vogue for over 30 years, particularly the management of the thermal energy distribution of the operational laser. In the conventional techniques, with the one "slab" of gain material, that slab or crystal quickly heats up. Each crystal produced a highly astigmated thermal "positive" optical lens due to the thermal gradients across its axes. The pump beam direction has a very weak, or non-existent lens as the steady state temperature across that crystal's interior along that axis is approximately constant. However, the temperature across the orthogonal axis to the pump "sheet", has a highly Gaussian profile, or relatively cool on the sides, and hot in the center. This creates an optical refractive gradient across the laser cavity beam, and thus a net positive lens. If this laser cavity was operated with one laser head on and the other off, or passive, the output laser beam would be highly multimode in 1 axis, or it would barely lase at all and produce an useable beam, unless a small circular optical aperture and negative cylinder lens was placed in the cavity to (a) constrain the optical mode to TEM00, and (b) crudely negate the positive cylindrical thermal lens in the single operating slab. As noted, it becomes increasingly difficult to manage or dissipate that heat buildup, especially for laser systems that cannot employ water cooling, e.g., an orbiting satellite or a probe in the depths of space exploration. A unique aspect of the instant orthogonal or V-assembly gain design is the use of the deformations to an advantage, e.g., the effects of the deformations offset one another between the two slabs of gain material 210.

Figure 3:
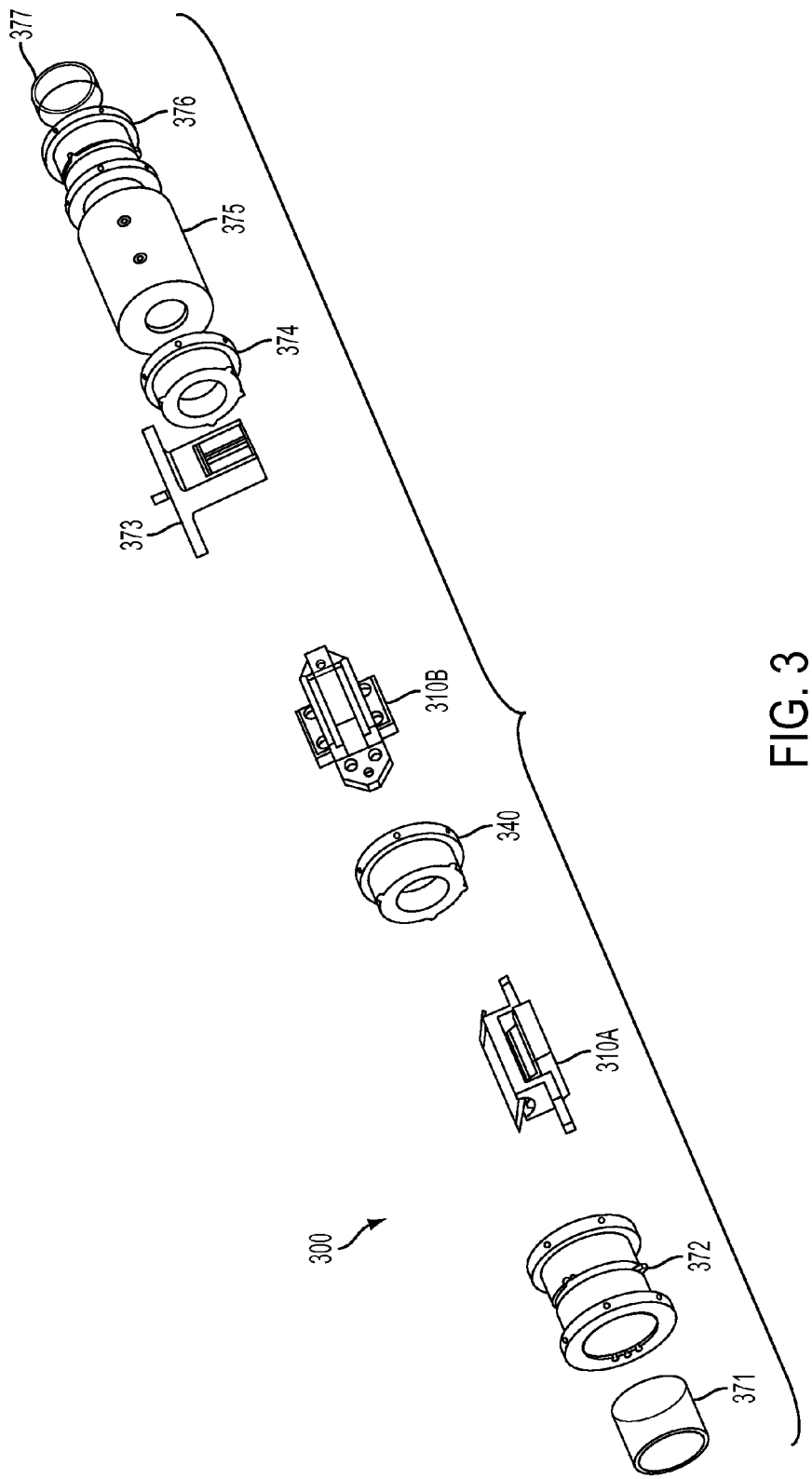
FIG. 3 is an exploded illustration of the components employed in a laser system using the present invention.
Figure 4:
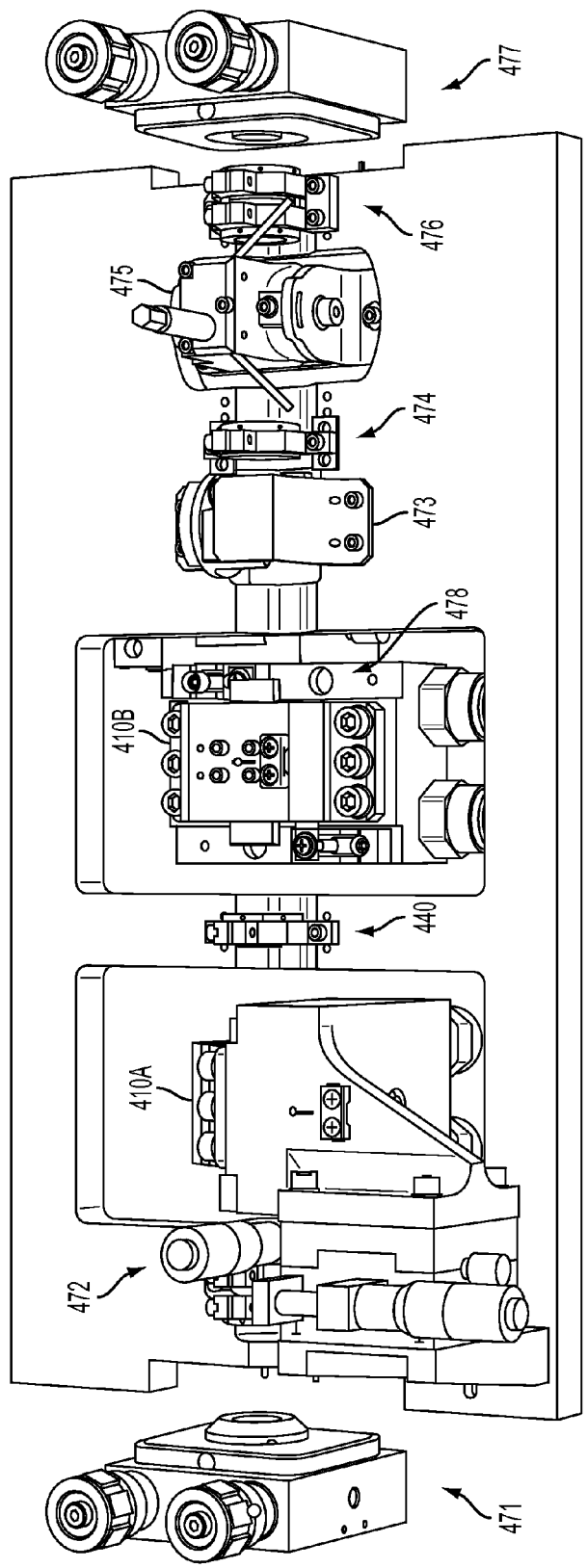
FIG. 4 illustrates the assembled components of FIG. 3.

With reference now to FIGS. 3 and 4, there are shown operational equipment employing the advantages of the present invention. Shown in FIG. 3 are the various components in an exploded view, generally designated by the reference numeral 300. A high reflective (HR) mirror 371 is at a first end. Adjacent the end mirror 371 are a pair of Risley prisms, generally designated by the reference numeral 372, which are employed for stabilization, as is understood to those of skill in the art. Adjacent the prisms 372 is one the aforedescribed devices of FIGS. 1 and 2, i.e., the gain material 210, the pump lens 230 and the diode array 220 assembled as in FIG. 2, generally designated by the reference numeral 310A. A waveplate 340, preferably the aforementioned one half waveplate, is between the assemblage 310A and a corresponding assemblage 310B on the opposite side.

Adjacent the assemblage 310B is a thin film polarizer (TFP), and adjacent that is another waveplate 374, albeit preferably a one quarter waveplate. Next is an electro-optic Q-switch 375, another pair of Risley prisms 376 and the terminal HF mirror 377.

As with conventional laser techniques, the gain material 310, augmented by the energy from the diodes, reaches saturation, at which point the photons travel between the mirrors 371 and 377, passing through the various components, particularly the assemblages 310A and 310B with the waveplate 340 therebetween. Unlike the prior art, however, the distortions due to thermal effects are minimized, offset by the unique arrangement of the dual head V-shaped configuration and the waveplate 340.

With reference now to FIG. 4 of the DRAWINGS, there is shown the various components illustrated and described in connection with FIG. 3 assembled into an operational device. Thus, starting at the left as in FIG. 3, there is shown a high reflective mirror 471 at one end of the device to receive the aforementioned photons along an axis generally through the center of the figure. Thus, adjacent the mirror 471 are Risley prisms 472. Next are assemblages 410A and 410B with a waveplate 440 therebetween, as discussed in connection with FIG. 3. Adjacent the assemblage 410B is a thin film polarizer 473, a one quarter waveplate 474, a Q-switch 475 and another pair of Risley prisms 476. At the terminus is the corresponding mirror 477. As discussed, the diodes pump the gain material 310 to saturation and the photons oscillate back and forth between the mirrors 471 and 477 until release along the axis.

As described hereinabove, the instant invention provides many significant advantages over the thermally-insecure devices of prior art. Discussed hereinbelow are more particular implementation of various aspects of the present invention. It should, of course, be understood that the principles of the instant invention are applicable to all or almost all diode pumped, solid state laser applications, particularly those where heat dissipation is a problem.

The present invention, termed the V-Assembly Dual-head Efficient Resonator (VADER) in one embodiment, offers a tremendous advancement in efficiency and lifetime over current solid state, flight laser designs, while greatly reducing system complexity and cost. Derived from earlier NASA laser efforts of the past decade, VADER employs a very similar cavity design, e.g., using a Positive Branch Unstable Resonator (PBUR), a conductively cooled, optically optimized zigzag slab or gain geometry, and a Gaussian Reflective Mirror (GRM) output coupler. When carefully implemented, this cavity structure matches or surpasses all the benefits of a more complex Master Oscillator Power Amplifier (MOPA) system, but with ⅓-½ the components. When considering the extensive manpower and hardware costs associated with any flight system of similar output, this translates to a large savings in cost and schedule for any mission. In a preferred embodiment, VADER produces Q-Switched laser pulses typical of MOPAs with low fluence, large beam size, inherent TEM00 beam quality, and symmetrical thermal lens compensation.

Applicants' VADER design was based on research proving that slab-based, oscillator only, aperture-free slab-based cavities are capable of producing high quality, laser pulses. Furthermore, these oscillators can also produce short pulse widths, pulse energies and even higher efficiencies than those commonly pursued with MOPA designs. The zigzag slab aspect of this effort is key for any flight system since liquid cooling, associated with rod based lasers, is a non-starter when conductive thermal control is required. Any added technologies or advances of the state of the art employed in the VADER effort is considered important for future LIDAR instruments NASA may pursue in the near future.

The various "new" components used in the VADER design are (a) the split head V-assembly gain module, (b) high power Quasi Continuous Wave (QCW) diode arrays rated at 200 W/bar, and (c) the use of ceramic Nd:YAG as the gain material. These individual items, concepts, and technologies are unique. The present invention is also notable for reduced part count, mass, complexity, and increased efficiency of any space-bound instrument. This is especially true of solid state laser technology for remote sensing missions, given that all of NASA's solid state flight lasers to date have all exhibited wallplug efficiencies in the low single digits. In VADER, it has 20 mJ pulse capability, firmly placing it in the ice and vegetation mapping altimeter class for Earth bound missions, as well as future planetary mappers for Mars and the Jovian planets' moons.

Using recent flight driver electronics efficiency values, VADER's wallplug efficiency is nearly 10%. The part count impact is an often underappreciated aspect of such a design, as many man hours/costs are incurred to insure each optical component will survive and operate to specifications in space. These costs for each component include the purchase of many spares, microscopic inspections and documentation, multiple precision cleanings, clean environmental storage and transport, performance characterization, bonding processes into flight hardware, as well as random selection of spares for optical damage testing. The present invention has the added virtue of being simpler in design and construction. For example, VADER has 12 optics, including 2 Risley pairs for alignment, while a typical single stage MOPA system would need at least 21 optical path components, including beam expansion, 2-pass amplification, and an extra 2 pair of Risleys for post cavity alignment; essentially a part count reduction by about half.

With earlier pulsed Nd:YAG systems employing the Positive Branch Unstable Resonator PBUR-GRM design, the single zig-zag slab produced a positive thermal lens with power perpendicular to the axis of the zig-zag plane, with a weak net-negative thermal lens in the other axis. This "cylindrical" lens increases in strength with higher repetition rates and average powers and thus, must be accounted for optically within the cavity with the addition of a negative cylinder lens within millimeters to one end of the slab. VADER's dual head geometry provides a symmetrical spherical thermal lens and is accounted for in the curvature of the nearby HR end mirror. Furthermore, subtle differences in net spectral line width of each pump diodes and absorption qualities in each slab will produce a slightly elliptical laser (TEM00) beams, due to unmatched thermal lensing in each axis. This beam can be spatially adjusted to maintain circular shape by fine-tuning the drive powers in each head. This capability is unavailable in all other solid state laser schemes, to the author's knowledge, and only possible with this dual head scheme.

The VADER laser cavity is currently in an "adjustable" breadboard state for mechanical sensitivity analysis, but employing flight quality mounts and head assemblies. This provides a proven means of transition to an all-flight hardware configuration for future environmental studies such as life testing, thermal vacuum, and vibration testing. It produces 20 mJ/pulse with each laser head employing a 4-bounce, side pumped zig-zag ceramic:Nd:YAG slab, 2.8 mm thick and a center length of 17.0 mm. In a preferred embodiment it is bonded to a MbCu heat sink to match the slab's thermal expansion and is held "over" a 4-bar diode array, rated at 200 W/bar. These arrays are preferably back cooled G-packages, operated at 100 A and 100 us at a repetition rate of 240 Hz. The theoretical models predict best performance with the aforementioned GRM and HR mirror curvatures at −2.15 mROC and −6.0 mROC, respectively. The 30 cm cavity length, the GRM's $1/c^2$ reflective spot of $w0=1.11$ mm, and it's peak reflectivity of R0=63% produces a Q-switched pulse width of ~9 ns. The cavity is preferably held at a 45 degree angle about the optic axis to allow for even convective cooling for each head. FIG. 4 shows the high degree of adjustment; 2 axes on each head and 5 axes for each end mirror. Eventually, the optical bench is designed to allow replacement of the gimbaled mirror mounts with flight quality bonded optic mounts to prepare the design for a transition to a miniaturized hardware design and enclosure.

In like fashion, the improved configuration of the present invention can be employed in many other situations where heat must be displaced or moved from the apparatus. Although particular embodiments are disclosed, it should be understood that the principles of the present invention may be made applicable in many other situations with similar needs and not just those of space exploration. Further usages of the instant invention are thus envisioned and within the scope of the present application and the claims.

It should be understood that the principles of the present invention may be made applicable in a wide range of situations, not necessarily the extremes of space exploration or high elevations. Indeed, the present invention may be employed not only in earth's (or other extraterrestrial bodies') orbits or atmospheres, but also in countless ground-based applications where high energy lasers are employed. The control of the laser beam is of critical importance in many optical instruments, and the principles of the present invention for reducing the deleterious effects of heat generation are thus useful in a wide context.

Although the present invention illustrates the usage of Neodymium-doped Yttrium Aluminum Garnet (Nd:YAG), a crystalline gain material, other such crystalline gain materials are applicable, provided the materials have sufficient performance capabilities. For example, additional gain materials include Gallium Scandium Gadolinium Garnet (GSGG), Ceramic YAG, and Yttrium Lithium Fluoride (YLF), particularly if Neodymium doped.

While the foregoing written description of the invention enables one of ordinary skill to make and use what is considered presently to be the best mode thereof, it should be understood that various changes, substitutions and alterations can be made herein without departing from the spirit and scope of the invention as defined by the appended claims. Therefore, the invention is not to be limited by the above described embodiment, method, and examples, but by all embodiments and methods within the scope and spirit of the invention as claimed.

We claim:

1. A space based laser device comprising:
    a first gain material, said first gain material having an orientation along an axis for a symmetrical single spatial mode round resultant laser beam;
    a second gain material, said second gain material having an orientation orthogonal to that of the first gain material and along said axis;
    a waveplate disposed between said first and second gain materials along said axis; and
    energy means including a plurality of diodes disposed along said first and second gain materials providing a spherical symmetrical thermal lens spatially adjusted to maintain a circular shape by use of an adjacent end mirror with means for fine tuning the drive powers in each diode to reduce elliptical aberrations to pump energy into said first and second gain materials along a zig-zag optical path while allowing laser slabs to behave optically like cylindrical laser rods formed into a dual split head V-shaped gain module in order to reduce distortion and increase efficiency in a transmitted laser beam.

2. The laser device according to claim 1, further comprising:
    at least one diode array.

3. The laser device according to claim 2, wherein said at least one diode array comprises a first diode array adjacent said first gain material and a second diode array adjacent said second gain material.

4. The laser device according to claim 1, wherein said first and second gain materials are made of a crystal or ceramic material.

5. The laser device according to claim 4, wherein said first and second gain materials are made of neodymium-doped ytterbium aluminum garnet.

6. The laser device according to claim 1, wherein said waveplate is a one half waveplate.

7. The laser device according to claim 1, further comprising a component selected from the group consisting of mirrors, high reflective mirrors, Risley prisms, pairs of Risley prisms, thin film polarizers, one quarter waveplates, electro-optic switches and a gradient reflective mirror output coupler.

8. The laser device according to claim 1, further comprising:
    at least one pumping lens, said at least one pumping lens focusing said energy means onto said first and second gain materials.

* * * * *